United States Patent
Abe et al.

(10) Patent No.: US 10,144,639 B2
(45) Date of Patent: Dec. 4, 2018

(54) METHOD FOR OPERATING HYDROGEN GENERATOR, HYDROGEN GENERATOR, AND FUEL CELL SYSTEM

(71) Applicant: Panasonic Intellectual Property Management Co., Ltd., Osaka (JP)

(72) Inventors: Miki Abe, Osaka (JP); Akinori Yukimasa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 26 days.

(21) Appl. No.: 15/063,307

(22) Filed: Mar. 7, 2016

(65) Prior Publication Data

US 2016/0264413 A1 Sep. 15, 2016

(30) Foreign Application Priority Data

Mar. 13, 2015 (JP) ................................ 2015-050616

(51) Int. Cl.
*H01M 8/0662* (2016.01)
*C01B 3/32* (2006.01)
(Continued)

(52) U.S. Cl.
CPC ................. *C01B 3/32* (2013.01); *B01J 19/24* (2013.01); *C01B 3/38* (2013.01); *C01B 3/50* (2013.01);
(Continued)

(58) Field of Classification Search
CPC ... B01J 19/24; C01B 3/38; C01B 3/50; C01B 2203/066; C01B 2203/127;
(Continued)

(56) References Cited

U.S. PATENT DOCUMENTS

2005/0100777 A1* 5/2005 Gurin ................ H01M 8/04097
429/415
2006/0251935 A1* 11/2006 Barrett .............. H01M 8/04097
429/415
(Continued)

FOREIGN PATENT DOCUMENTS

| JP | 2002-356308 | 12/2002 |
|---|---|---|
| JP | 2003-306309 | 10/2003 |
| JP | 2014-089919 | 5/2014 |

OTHER PUBLICATIONS

The Extended European Search Report dated Jul. 12, 2016 for the related European Patent Application No. 16158235.8.

*Primary Examiner* — Jonathan G Jelsma
*Assistant Examiner* — Omar M Kekia
(74) *Attorney, Agent, or Firm* — McDermott Will & Emery LLP

(57) ABSTRACT

A method for operating a hydrogen generator includes producing a hydrogen-containing gas from a source gas fed from a hydrodesulfurizer and reforming water with a reformer; feeding part of the hydrogen-containing gas to the hydrodesulfurizer as a recycle gas, and removing a sulfur compound contained in the source gas with the hydrodesulfurizer; condensing water vapor contained in the recycle gas in a recycle-gas channel through which the recycle gas flows, and separating the resulting condensed water from the recycle-gas channel; and regulating the amount of reforming water fed to the reformer on the basis of the temperature of the reformer.

8 Claims, 6 Drawing Sheets

(51) Int. Cl.
  *C01B 3/38*   (2006.01)
  *B01J 19/24*   (2006.01)
  *C01B 3/50*   (2006.01)
  *H01M 8/04089*  (2016.01)
  *H01M 8/0612*  (2016.01)
  *H01M 8/1246*  (2016.01)
  *H01M 8/124*  (2016.01)

(52) U.S. Cl.
  CPC ..... *H01M 8/04097* (2013.01); *H01M 8/0618* (2013.01); *H01M 8/0675* (2013.01); *H01M 8/1246* (2013.01); *C01B 2203/0233* (2013.01); *C01B 2203/0244* (2013.01); *C01B 2203/045* (2013.01); *C01B 2203/0485* (2013.01); *C01B 2203/066* (2013.01); *C01B 2203/127* (2013.01); *C01B 2203/148* (2013.01); *C01B 2203/169* (2013.01); *H01M 2008/1293* (2013.01); *H01M 2300/0071* (2013.01)

(58) Field of Classification Search
  CPC ...... C01B 2203/148; C01B 2203/1619; C01B 2203/169; C01B 2203/0485; C01B 2203/045; C01B 2203/0244; C01B 3/32; C01B 2203/0233; H01M 8/0618; H01M 8/04097; H01M 2300/0071; H01M 2008/1293; H01M 8/1246; H01M 8/0675
  USPC .......................................................... 429/410
  See application file for complete search history.

(56) References Cited

U.S. PATENT DOCUMENTS

2012/0040256 A1  2/2012  Kani et al.
2012/0178006 A1  7/2012  Kani et al.

\* cited by examiner

METHOD FOR OPERATING HYDROGEN GENERATOR, HYDROGEN GENERATOR, AND FUEL CELL SYSTEM

BACKGROUND

1. Technical Field

The present disclosure relates to a method for operating a hydrogen generator, a hydrogen generator, and a fuel cell system.

2. Description of the Related Art

A hydrogen-containing gas, which serves as a fuel for a fuel cell system, is normally produced by, for example, reforming a source gas such as a hydrocarbon fuel with a reformer. The source gas may contain a sulfur compound used as an odorant or derived from the raw material. Since the sulfur compound may poison a reforming catalyst included in the reformer, the sulfur compound contained in the source gas needs to be removed before the source gas is fed to the reformer.

A known example of a desulfurizer that removes the sulfur compound is a hydrodesulfurizer. In a hydrodesulfurizer, desulfurization is performed by reacting the sulfur compound with hydrogen in the presence of a suitable catalyst to produce hydrogen sulfide and causing the hydrogen sulfide to be adsorbed to a catalyst. Since the hydrodesulfurization requires hydrogen, part of the hydrogen-containing gas produced by the reformer is commonly fed to the hydrodesulfurizer as a recycle gas (e.g., see Japanese Unexamined Patent Application Publication 2002-356308, which is referred to as "PTL 1" hereinafter).

However, it cannot be said that the risk of the reformer being degraded due to shortage of water vapor available in the reformer which may occur in the case where the recycle gas is fed to the hydrodesulfurizer has been studied in PTL 1 to a sufficient degree.

SUMMARY

One non-limiting and exemplary embodiment provides a method for operating a hydrogen generator, a hydrogen generator, and a fuel cell system that may reduce the risk of a reformer being degraded due to shortage of water vapor available in the reformer which may occur in the case where a recycle gas is fed to a hydrodesulfurizer compared with those of the related art.

In one general aspect, the techniques disclosed here feature a method for operating a hydrogen generator, the method including producing a hydrogen-containing gas from a source gas fed from a hydrodesulfurizer and reforming water with a reformer; feeding part of the hydrogen-containing gas to the hydrodesulfurizer as a recycle gas, and removing a sulfur compound contained in the source gas with the hydrodesulfurizer; condensing water vapor contained in the recycle gas with a condenser disposed on a recycle-gas channel through which the recycle gas flows, and separating the resulting condensed water from the recycle-gas channel; and regulating the amount of reforming water fed to the reformer on the basis of the temperature of the reformer.

The method for operating a hydrogen generator according to the aspect of the present disclosure may reduce the risk of a reformer being degraded due to shortage of water vapor available in the reformer which may occur in the case where the recycle gas is fed to a hydrodesulfurizer compared with that of the related art.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

First Embodiment

Figure 1:
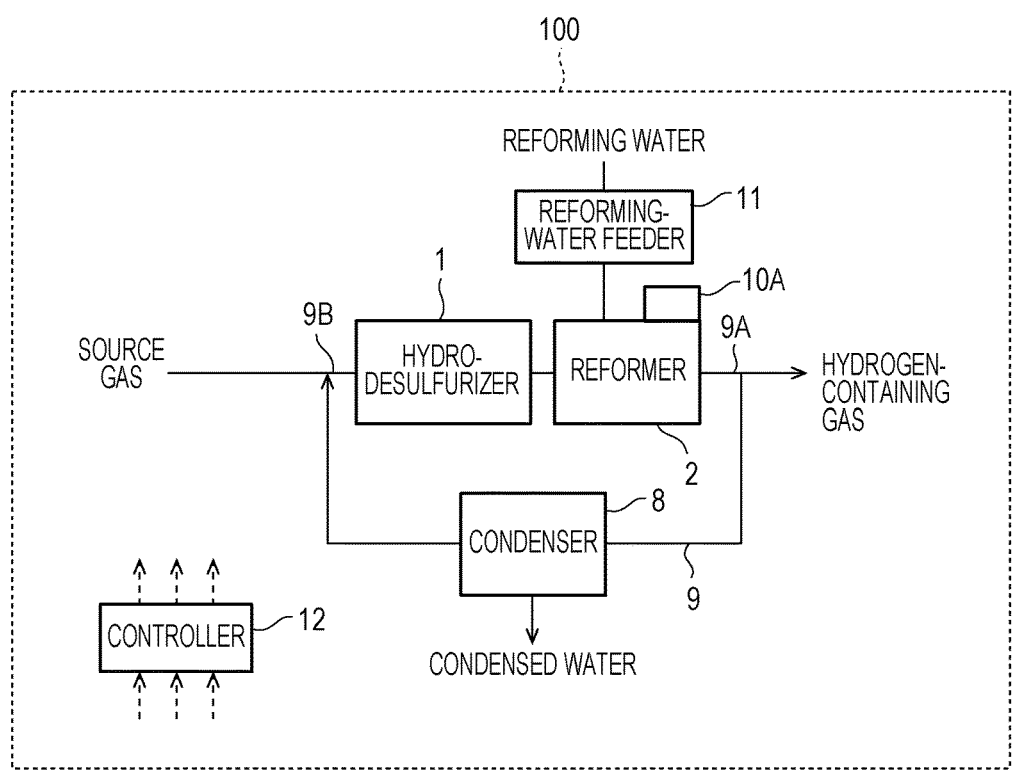
FIG. 1 illustrates an example of a hydrogen generator according to the first embodiment.

The inventors of the present disclosure have conducted extensive studies of the risk of the reformer being degraded due to shortage of water vapor available in the reformer which may occur in the case where the recycle gas is fed to the hydrodesulfurizer and, as a result, found the following facts.

The recycle gas flows through a recycle-gas channel and merges with a source gas that flows through a source-gas channel. The recycle gas contains water vapor as well as hydrogen since the recycle gas is part of the hydrogen-containing gas produced by a reforming reaction of the source gas. Therefore, when the recycle gas is cooled while flowing through the recycle-gas channel, water vapor contained in the recycle gas may be condensed. If water vapor contained in the recycle gas flowing through the recycle-gas channel is condensed, the recycle-gas channel may be clogged with the condensed water.

Accordingly, a method in which water vapor contained in the recycle gas is condensed with a condenser disposed on the recycle-gas channel and the resulting condensed water is separated from the recycle-gas channel has been commonly employed in the related art as in PTL 1. In this method, water vapor condensed with the condenser does not return to the reformer. In PTL 1, the amount of condensed water produced in the condenser is not intended to be detected.

Therefore, in PTL 1, for example, if the amount of condensed water is excessively large, shortage of water vapor required by a reforming reaction may occur, which reduces a substantial steam carbon ratio (S/C) of the reformer. The amount of the condensed water may become excessively large, for example, under the following conditions. When the temperature of the reformer is reduced, the source-gas conversion proportion of the reformer is reduced and the content of water vapor in the recycle gas is accordingly increased. As a result, the amount of condensed water produced in the condenser is increased compared with the case where the temperature of the reformer is high. In such a case, carbon may precipitate on a reforming catalyst included in the reformer. This deteriorates the reformer.

S/C is an abbreviation for "steam/carbon", which refers to the molar ratio of the amount of water vapor added to the reformer to the amount of carbon included in hydrocarbon contained in the source gas. S/C has been commonly used as one of the indices for determining the likelihood of carbon precipitating on the reforming catalyst.

One of the countermeasures against the degradation of the reformer described above is to feed an excessively large amount of reforming water to the reformer in the normal operation of the hydrogen generator. However, in this method, the excessively large amount of reforming water, which is larger than required by a reforming reaction, needs to be converted into water vapor with an evaporator and, as a result, the energy efficiency of the hydrogen generator may be reduced.

The inventors of the present disclosure have reached an idea that the risk of the reformer being degraded due to carbon precipitating on the reforming catalyst may be reduced by regulating the amount of reforming water fed to the reformer on the basis of the temperature of the reformer. A hydrogen generator according to the first embodiment was devised on the basis of the above idea.

Specifically, when the temperature of the reformer is reduced, the source-gas conversion proportion of the reformer is reduced and the content of water vapor in the recycle gas is accordingly increased. In such a case, the amount of condensed water produced in the condenser is increased compared with the case where the temperature of the reformer is high. Therefore, the amount of reforming water fed to the reformer needs to be increased in order to limit a reduction in the substantial S/C of the reformer.

For example, when the temperature of the condenser is low, the amount of condensed water produced in the condenser is larger than in the case where the temperature of the condenser is high. Therefore, the amount of reforming water fed to the reformer needs to be increased in order to limit a reduction in the S/C of the reformer.

For example, when the flow rate of the recycle gas is increased, the amount of condensed water produced in the condenser is increased and the amount of source gas returned to the source-gas channel is also increased. In such a case, the substantial S/C of the reformer is reduced compared with the case where the flow rate of the recycle gas is low. Thus, the amount of reforming water fed to the reformer needs to be increased in order to limit a reduction in the substantial S/C of the reformer.

The phenomena described above as examples may occur simultaneously. In such a case, the amount of reforming water fed to the reformer needs to be increased for the same reason.

Specifically, a method for operating a hydrogen generator according to the first embodiment includes producing a hydrogen-containing gas from a source gas fed from a hydrodesulfurizer and reforming water with a reformer; feeding part of the hydrogen-containing gas to the hydrodesulfurizer as a recycle gas, and removing a sulfur compound contained in the source gas with the hydrodesulfurizer; condensing water vapor contained in the recycle gas with a condenser disposed on a recycle-gas channel through which the recycle gas flows, and separating the resulting condensed water from the recycle-gas channel; and regulating the amount of reforming water fed to the reformer on the basis of the temperature of the reformer.

A hydrogen generator according to the first embodiment includes a hydrodesulfurizer that removes a sulfur compound contained in a source gas by hydrodesulfurization; a reformer that produces a hydrogen-containing gas from the source gas fed from the hydrodesulfurizer and reforming water by a reforming reaction; a reforming-water feeder that feeds the reforming water to the reformer; a recycle-gas channel through which part of the hydrogen-containing gas produced by the reformer is fed to the hydrodesulfurizer as a recycle gas; a condenser disposed on the recycle-gas channel, the condenser condensing water vapor contained in the recycle gas and separating the resulting condensed water from the recycle-gas channel; a first temperature sensor that detects the temperature of the reformer; and a controller that controls the reforming-water feeder such that the amount of the reforming water is regulated on the basis of the temperature of the reformer.

This may reduce the risk of the reformer being degraded due to shortage of water vapor available in the reformer which may occur in the case where the recycle gas is fed to the hydrodesulfurizer compared with that of the related art. In other words, the risk of the reformer being degraded may be reduced by detecting variations in the composition of the recycle gas fed to the hydrodesulfurizer and the flow rate of each component of the recycle gas on the basis of the temperature of the reformer. Specifically, when the amount of condensed water is increased due to variations in the temperature of the reformer, the amount of reforming water fed to the reformer is increased since the S/C of the reformer is reduced as described above. This may limit a reduction in the S/C of the reformer and, as a result, reduce the risk of the reformer being degraded due to carbon precipitating on the reforming catalyst compared with that of the related art.

A specific example of the first embodiment is described below with reference to the attached drawings.

Structure

FIG. 1 illustrates an example of a hydrogen generator according to the first embodiment.

A hydrogen generator 100 according to the first embodiment includes a hydrodesulfurizer 1, a reformer 2, a reforming-water feeder 11, a recycle-gas channel 9, a condenser 8, a first temperature sensor 10A, and a controller 12 as illustrated in FIG. 1.

The hydrodesulfurizer 1 removes sulfur compounds contained in a source gas by hydrodesulfurization. The hydrodesulfurizer 1 is disposed upstream of the reformer 2 on a source-gas channel. The hydrodesulfurizer 1 includes, for example, a container filled with a hydrodesulfurization agent. An example of the hydrodesulfurization agent is, but not limited to, a CuZn catalyst that enables a sulfur compound to be converted into hydrogen sulfide and adsorbs the hydrogen sulfide. Alternatively, for example, a CoMo catalyst that enables a sulfur compound contained in the source gas to be converted into hydrogen sulfide and a ZnO catalyst or a CuZn catalyst that is disposed downstream of the CoMo catalyst and serves as a sulfur adsorbent that adsorbs and removes the hydrogen sulfide may be used in combination.

The source gas is a gas including an organic compound containing at least carbon and hydrogen, and examples thereof include town gas mainly containing methane, natural gas, and liquefied petroleum gas (LPG). The source gas contains sulfur compounds derived from the raw material or used as an odorant. For example, town gas contains dimethyl sulfide ($C_2H_6S$, DMS) as an odorant. Examples of odorants other than DMS include tert-butyl mercaptan ($C_4H_{10}S$, TBM) and tetrahydrothiophene ($C_4H_8S$, THT).

Hydrogenation using a CuZn catalyst is preferably performed at 150° C. or more and 400° C. or less and is further preferably performed at 150° C. or more and 300° C. or less. A CuZn catalyst induces chemisorption ($H_2S+ZnO \rightarrow H_2O+ZnS$) in the above high-temperature range, while it mainly induces physical adsorption in a low-temperature range (e.g., normal temperature of 10° C. or more).

For example, DMS contained in the source gas is removed from the source gas by hydrodesulfurization represented by Equations (1) and (2) below.

$$C_2H_6S+2H_2 \rightarrow 2CH_4+H_2S \qquad (1)$$

$$H_2S+ZnO \rightarrow H_2O+ZnS \qquad (2)$$

The reformer 2 produces a hydrogen-containing gas from the source gas fed from the hydrodesulfurizer 1 and reforming water by a reforming reaction. Specifically, a hydrogen-containing gas is produced by a reforming reaction of the source gas in the reformer 2. Examples of the reforming reaction include a water vapor reforming reaction and an autothermal reaction. The reformer 2 is filled with a catalyst for the reforming reaction, that is, a reforming catalyst. Examples of the reforming catalyst include alumina ($Al_2O_3$) catalysts on which Ni or ruthenium is deposited.

Although not illustrated in FIG. 1, any device required by the reforming reaction may optionally be used. For example, when the reforming reaction is a water vapor reforming reaction, a combustor that heats the reformer 2, an evaporator that produces water vapor from the reforming water, and the like may optionally be used. When the reforming reaction is an autothermal reaction, an air feeder that feeds air to the reformer 2 may be further used.

The reforming-water feeder 11 feeds reforming water to the reformer 2. The reforming-water feeder 11 may have any structure that enables the reformer 2 to be fed with reforming water. An example of the reforming-water feeder 11 is a fixed-displacement pump.

The recycle-gas channel 9 is a channel through which part of the hydrogen-containing gas produced in the reformer 2 is fed to the hydrodesulfurizer 1 as a recycle gas. The upstream end 9A of the recycle-gas channel 9 may be connected to the channel through which the hydrogen-containing gas fed from the reformer 2 flows at any position. For example, the upstream end 9A of the recycle-gas channel 9 may be connected to a channel located downstream of a hydrogen utilization device that uses the hydrogen-containing gas. The downstream end 9B of the recycle-gas channel 9 is connected to the source-gas channel at a position upstream of the hydrodesulfurizer 1. For example, the downstream end 9B of the recycle-gas channel 9 may be connected to a portion of the source-gas channel which is located between a source-gas flow sensor (not illustrated) and a source-gas feeder (not illustrated). The source-gas feeder is a device that regulates the flow rate of the source gas fed to the hydrodesulfurizer 1 and the reformer 2. The source-gas feeder includes, for example, a booster and a flow regulating valve. Alternatively, the source-gas feeder may include only one of a booster and a flow regulating valve. An example of the booster is, but not limited to, a fixed-displacement pump. The source gas is fed from a source-gas feeding source. The source-gas feeding source has a predetermined feeding pressure, and examples thereof include a source gas bomb and a source-gas infrastructure.

The condenser 8, which is disposed on the recycle-gas channel 9, condenses water vapor contained in the recycle gas and removes the resulting condensed water from the recycle-gas channel 9. The condenser 8 may have any structure that enables water vapor contained in the recycle gas to be condensed and the resulting condensed water to be separated from the recycle-gas channel 9. A specific example of the condenser 8 is described below in the second embodiment.

If water vapor contained in the recycle gas flowing through the recycle-gas channel 9 is condensed, the recycle-gas channel 9 may be clogged with the resulting condensed water. If the clogging of the recycle-gas channel 9 occurs, which makes it difficult to feed an adequate amount of recycle gas to the hydrodesulfurizer 1, sulfur compounds contained in the source gas may fail to be removed to a sufficient degree with the hydrodesulfurizer 1 and, as a result, the reforming catalyst included in the reformer 2 may be degraded due to the sulfur compounds contained in the source gas. Therefore, the condenser 8 is disposed on the recycle-gas channel 9 in order to reduce the above risk.

The first temperature sensor 10A detects the temperature of the reformer 2. Specifically, the first temperature sensor 10A detects the temperature of the reforming catalyst of the reformer 2. The first temperature sensor 10A may have any structure that enables the temperature of the reformer 2, that is, the temperature of the reforming catalyst of the reformer 2, to be detected in a direct or indirect manner. For example, the first temperature sensor 10A may be disposed on the reforming catalyst in order to detect the temperature of the reforming catalyst in a direct manner. In another case, the first temperature sensor 10A may be disposed at a specific portion of the reformer 2 which has a correlation with the temperature of the reforming catalyst (e.g., the surface or the vicinity of the surface of the container of the reformer 2) in order to detect the temperature of the reforming catalyst in an indirect manner. Examples of the first temperature sensor 10A include a thermocouple and a thermistor thermometer.

The controller 12 controls the reforming-water feeder 11 such that the amount of reforming water is regulated on the basis of the temperature of the reformer 2. The controller 12 may have any structure as long as it has a control function. The controller 12 includes a processing unit (not illustrated) and a storage unit (not illustrated) in which a control program is stored. Examples of the processing unit include an MPU and a CPU. An example of the storage unit is a memory. The controller 12 may be a single controller that performs a centralized control or include plural subcontrollers that perform a decentralized control in cooperation with one another. The temperature of the reformer 2 is, for example, the temperature of the catalyst included in the reformer 2 or the temperature of the hydrogen-containing gas emitted from the reformer 2. The temperature of the reforming catalyst may be detected with a temperature sensor in a direct manner. In another case, a temperature sensor may be disposed at a portion of the reformer 2 which has a correlation with the temperature of the reforming catalyst (e.g., the surface or the vicinity of the surface of the container of the reformer 2) in order to detect the temperature of the reforming catalyst in an indirect manner.

Operation

An example operation of the hydrogen generator according to the first embodiment is described below. The following operation is performed when each device included in the hydrogen generator 100 is controlled by a control program executed by the controller 12.

While the hydrogen generator 100 is operated, a hydrogen-containing gas is produced from a source gas fed from the hydrodesulfurizer 1 and reforming water with the reformer 2. Part of the hydrogen-containing gas is fed to the hydrodesulfurizer 1 as a recycle gas, and sulfur compounds contained in the source gas are removed in the hydrodesulfurizer 1. Thus, a hydrogen-containing gas used in hydrogen utilization devices (e.g., fuel cells) may be produced in a suitable manner.

At this time, water vapor contained in the recycle gas is condensed in the condenser 8, which is disposed on the recycle-gas channel 9 through which the recycle gas flows. The resulting condensed water is separated from the recycle-gas channel 9. If the water vapor contained in the recycle gas flowing though the recycle-gas channel 9 is condensed, the recycle-gas channel 9 may be clogged with the condensed water. However, such a risk may be reduced in the above-described operation.

The amount of reforming water fed to the reformer 2 is regulated on the basis of the temperature of the reformer 2.

Thus, the risk of the reformer 2 being degraded due to shortage of water vapor available in the reformer 2 which may occur in the case where the recycle gas is fed to the hydrodesulfurizer 1 may be reduced compared with that of the related art. In other words, the risk of the reformer 2 being degraded may be reduced by detecting variations in the composition of the recycle gas fed to the hydrodesulfurizer 1 and the flow rate of each component of the recycle gas on the basis of the temperature of the reformer 2. Specifically, when the temperature of the reformer 2 is reduced, the amount of reforming water fed to the reformer 2 is increased since the S/C of the reformer 2 is reduced as described above. This may limit a reduction in the S/C of the reformer 2 and, as a result, reduce the risk of the reformer 2 being degraded due to carbon precipitating on the reforming catalyst compared with that of the related art.

The amount of reforming water fed to the reformer 2 is desirably regulated on the basis of the temperature of the reformer 2 and at least one selected from the flow rate of the recycle gas that flows through the recycle-gas channel 9 and the temperature of the condenser 8. This enables the amount of reforming water to be regulated appropriately.

Example

A method for operating a hydrogen generator according to an example of the first embodiment includes producing a hydrogen-containing gas from a source gas fed from a hydrodesulfurizer and reforming water with a reformer; feeding part of the hydrogen-containing gas to the hydrodesulfurizer as a recycle gas, and removing a sulfur compound contained in the source gas with the hydrodesulfurizer; condensing water vapor contained in the recycle gas with a condenser disposed on a recycle-gas channel through which the recycle gas flows, and separating the resulting condensed water from the recycle-gas channel; and regulating the amount of reforming water fed to the reformer on the basis of the temperature of the reformer.

A hydrogen generator according to an example of the first embodiment includes a hydrodesulfurizer that removes a sulfur compound contained in the source gas by hydrodesulfurization; a reformer that produces a hydrogen-containing gas from the source gas fed from the hydrodesulfurizer and reforming water by a reforming reaction; a reforming-water feeder that feeds the reforming water to the reformer; a recycle-gas channel through which part of the hydrogen-containing gas produced by the reformer is fed to the hydrodesulfurizer as a recycle gas; a condenser disposed on the recycle-gas channel, the condenser condensing water vapor contained in the recycle gas and separating the resulting condensed water from the recycle-gas channel; a first temperature sensor that detects the temperature of the reformer; and a controller that controls the reforming-water feeder such that the amount of the reforming water is regulated on the basis of the temperature of the reformer.

The amount of reforming water fed to the reformer is derived on the basis of the amount of condensed water produced in the condenser. The amount of condensed water produced in the condenser is derived on the basis of the source-gas conversion proportion of the reformer, which is derived on the basis of the temperature of the reformer. Specifically, the source-gas conversion proportion of the reformer is derived on the basis of the correlation of the source-gas conversion proportion of the reformer with the temperature of the reformer or the correlation of the source-gas conversion proportion of the reformer with the temperature of the reformer and the steam carbon ratio of the reformer.

The hydrogen generator according to an example of the first embodiment is based on the hydrogen generator according to the first embodiment and further includes a flow sensor that detects the flow rate of the recycle gas and a second temperature sensor that detects the temperature of the condenser. In this hydrogen generator, the controller derives the amount of condensed water produced in the condenser on the basis of the temperature of the condenser or the flow rate of the recycle gas and regulates the amount of reforming water fed to the reformer accordingly.

Thus, the source-gas conversion proportion of the reformer may be derived in a suitable manner by detecting the temperature of the reformer, and variations in the amount of condensed water produced due to condensation of water vapor contained in the recycle gas may be detected in a suitable manner. As a result, the amount of reforming water fed to the reformer may be regulated appropriately, which reduces the risk of the reformer being degraded in a suitable manner.

A method for operating the hydrogen generator according to this example may be the same as the method for operating the hydrogen generator according to the first embodiment except for the above-described features. The structure of the hydrogen generator according to this example may be the same as the structure of the hydrogen generator according to the first embodiment except for the above-described features.

Structure

Figure 2:
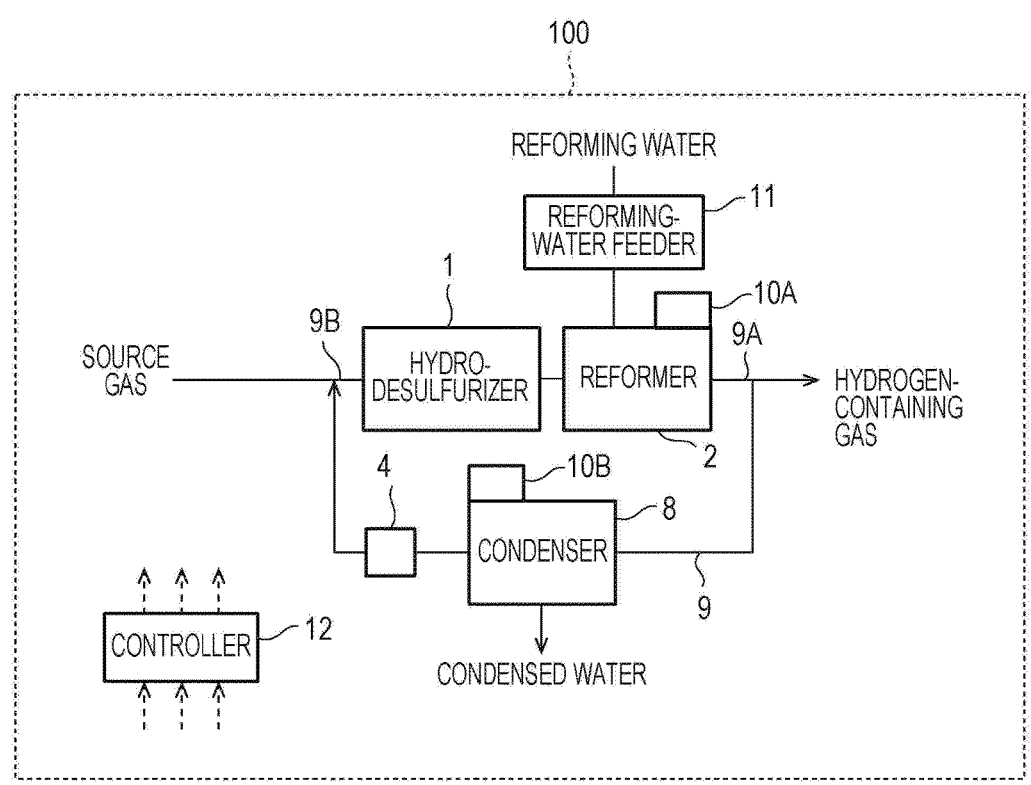
FIG. 2 illustrates an example of a hydrogen generator according to an example of the first embodiment.

FIG. 2 illustrates an example of the hydrogen generator according to the example of the first embodiment.

A hydrogen generator 100 according to the example of the first embodiment includes a hydrodesulfurizer 1, a reformer 2, a reforming-water feeder 11, a recycle-gas channel 9, a condenser 8, a flow sensor 4, a first temperature sensor 10A, a second temperature sensor 10B, and a controller 12 as illustrated in FIG. 2. The hydrodesulfurizer 1, the reformer 2, the reforming-water feeder 11, the recycle-gas channel 9, and the condenser 8 are the same as in the first embodiment, and the descriptions thereof are omitted.

Figure 3:
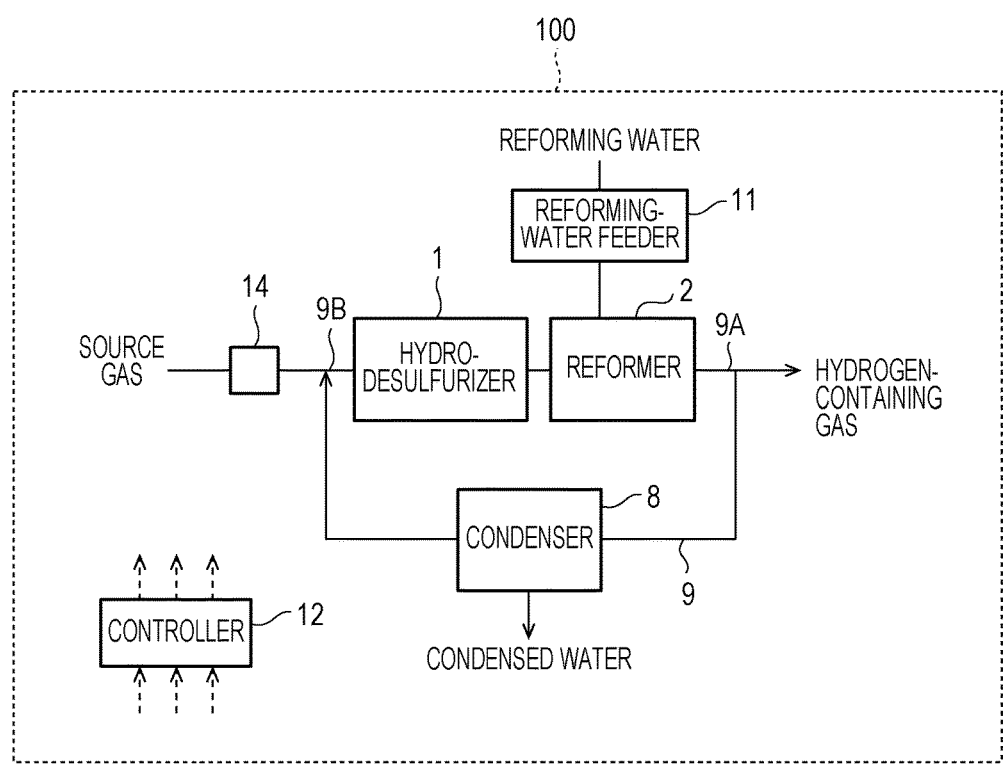
FIG. 3 illustrates another example of a hydrogen generator according to an example of the first embodiment.

The flow sensor 4 detects the flow rate of the recycle gas. The flow sensor 4 may have any structure that enables the flow rate of the recycle gas that flows through the recycle-gas channel 9 to be detected. An example of the flow sensor 4 is a flowmeter disposed on the recycle-gas channel 9 as illustrated in FIG. 2. Examples of the flowmeter include a mass flowmeter that detects the mass flow rate of the recycle gas and a volume flowmeter that detects the volume flow rate of the recycle gas. The flow sensor 4 may be, for example, a pressure regulating valve with which the proportion of the flow rate of the recycle gas to the flow rate of the source gas can be regulated. That is, the controller 12 detects the flow rate of the recycle gas on the basis of a control signal with which the degree of opening of the pressure regulating valve is controlled. Alternatively, as illustrated in FIG. 3, the sensor that detects the flow rate of the recycle gas may be a manometer 14 disposed on a portion of the source-gas channel which is located between the position at which the recycle gas merges with the source gas and a source-gas flow regulator. In such a case, the flow rate of the recycle gas can be estimated on the basis of the difference between the pressure at the upstream end 9A of the recycle-gas channel 9 and the pressure detected by the manometer 14. For example, a table providing the correlation between the difference in pressure and the flow rate of the recycle gas may be stored in the memory of the controller 12. The pressure at the upstream end 9A of the recycle-gas channel 9 can be estimated on the basis of input conditions such as the flow rate of the source gas, the temperature of the reformer 2, and the S/C of the reformer 2. Thus, the flow rate of the recycle gas that flows through the recycle channel 9 can be regulated by changing the difference between the pressure of the source gas measured at a position between the position at which the recycle gas merges with the source gas and the source-gas flow regulator (not illustrated) and the pressure at the upstream end 9A of the recycle-gas channel 9.

The second temperature sensor 10B detects the temperature of the condenser 8. Specifically, the second temperature sensor 10B detects the condensation temperature of the recycle gas cooled by the condenser 8. The second temperature sensor 10B may have any structure that enables the temperature of the condenser 8, that is, the condensation temperature of the recycle gas cooled by the condenser 8, to be detected in a direct or indirect manner. For example, the condense temperature of the recycle gas may be detected in a direct manner immediately after the recycle gas has passed through the condenser 8. Alternatively, the temperature of an environment under which the condenser 8 is cooled may be detected in order to detect the condensation temperature of the recycle gas in an indirect manner. Examples of the second temperature sensor 10B include a thermocouple and a thermistor thermometer.

The controller 12 derives the amount of condensed water on the basis of the temperature of the condenser 8 or the flow rate of the recycle gas and regulates the amount of reforming water fed to the reformer accordingly. The controller 12 also derives the source-gas conversion proportion of the reformer 2 on the basis of the correlation of the source-gas conversion proportion of the reformer 2 with the temperature of the reformer 2 or the correlation of the source-gas conversion proportion of the reformer 2 with the temperature of the reformer 2 and the steam carbon ratio of the reformer 2.

Operation

Figure 4:
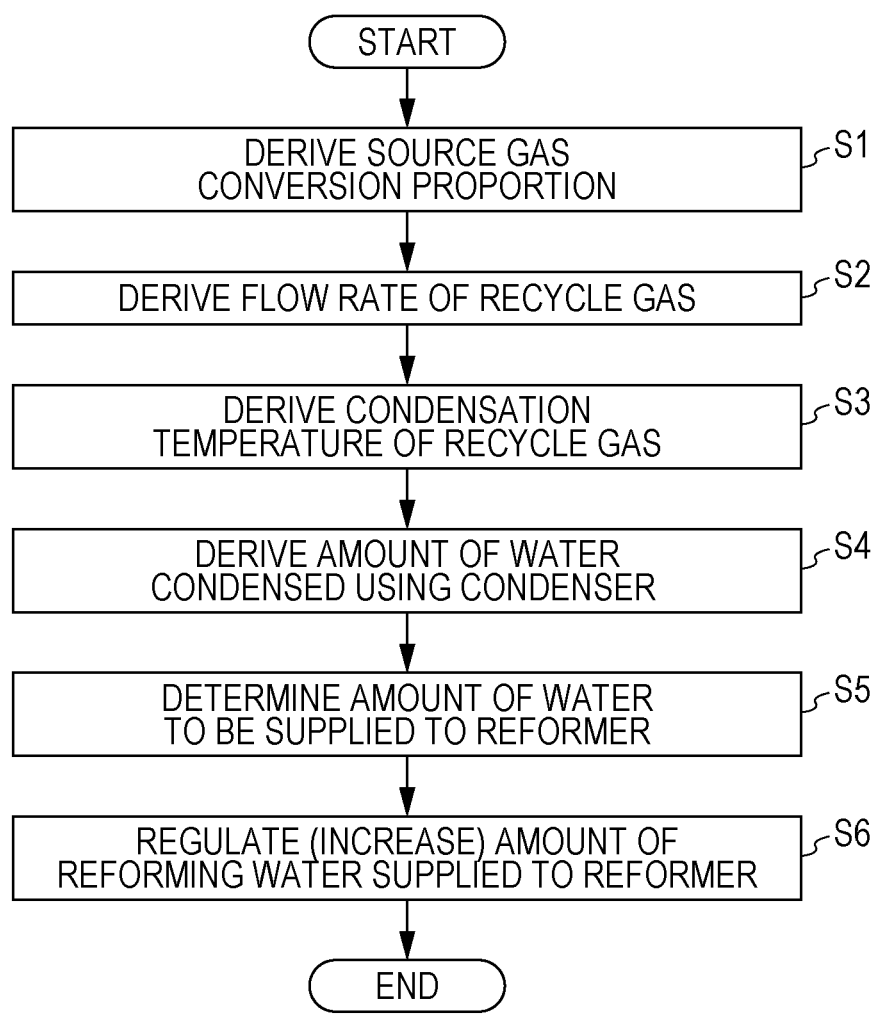
FIG. 4 is a flowchart illustrating an example operation of a hydrogen generator according to an example of the first embodiment.

FIG. 4 is a flowchart illustrating an example operation of the hydrogen generator according to the example of the first embodiment. The following operation is performed when each device included in the hydrogen generator 100 is controlled by a control program executed by the controller 12.

In Step S1, the source-gas conversion proportion of the reformer 2 is derived. The term "source-gas conversion proportion" used herein refers to the proportion of the flow rate of the source gas used for a reforming reaction in the reformer 2 to the flow rate of the source gas fed to the reformer 2.

The source-gas conversion proportion of the reformer 2 varies depending on the temperature of the reformer 2. Thus, the source-gas conversion proportion of the reformer 2 is derived on the basis of the correlation of the source-gas conversion proportion of the reformer 2 with the temperature of the reformer 2. For example, the correlation of the source-gas conversion proportion of the reformer 2 with the temperature of the reformer 2 which has been determined from an examination or the like may be stored in the memory of the controller 12 in the form of a data table. This enables the controller 12 to derive the source-gas conversion proportion of the reformer 2 on the basis of the temperature detected by the first temperature sensor 10A and the above correlation. The method for deriving the source-gas conversion proportion of the reformer 2 in Step S1 is merely an example, and a method for deriving the source-gas conversion proportion of the reformer 2 is not limited to this. For example, in the case where the S/C of the reformer 2 varies, the source-gas conversion proportion of the reformer 2 may be derived on the basis of the correlation of the source-gas conversion proportion of the reformer 2 with the temperature of the reformer 2 and the S/C of the reformer 2.

In Step S2, the flow rate of the recycle gas is derived. Specifically, the controller 12 detects the flow rate of the recycle gas on the basis of the flow rate detected by the flow sensor 4. The recycle gas contains the hydrogen gas produced by a reforming reaction in the reformer 2, a source gas that was not used in the reforming reaction and remained in the recycle gas, and water vapor. Since the composition of the source gas (e.g., methane gas when the source gas is natural gas) and the mode of the reforming reaction that occurs in the reformer 2 can be specified in advance, the composition of the recycle gas (e.g., methane gas, water vapor, hydrogen gas, and the like when the source gas is natural gas) and the flow rate of each component can be determined from the source-gas conversion proportion of the reformer 2 detected in Step S1 and the flow rate of the recycle gas.

In Step S3, the condensation temperature of the recycle gas is derived. Specifically, the controller 12 determines the temperature of the condenser 8, that is, the condensation temperature of the recycle gas cooled in the condenser 8, on the basis of the temperature detected by the second temperature sensor 10B.

In Step S4, the amount of condensed water produced in the condenser 8 is derived. Specifically, the amount of condensed water produced in the condenser 8 is derived on the basis of the source-gas conversion proportion of the reformer 2 derived in Step S1, the flow rate of the recycle gas derived in Step S2, and the temperature of the condenser 8, that is, the condensation temperature of the recycle gas cooled in the condenser 8.

The above-described method for deriving the amount of condensed water in Step 4 is merely an example, and a method for deriving the amount of condensed water is not limited to this method. For example, in the case where the condense temperature of the recycle gas is reduced due to a reduction in the outside air temperature, the controller 12 may derive the amount of condensed water produced in the condenser 8 on the basis of only the condense temperature of the recycle gas derived in Step S3 with the source-gas conversion proportion of the reformer 2 and the flow rate of the recycle gas being set to be desired values. In other words, the amount of condensed water may be derived on the basis of the condense temperature of the recycle gas or the flow rate of the recycle gas.

In Step S5, the amount of reforming water fed to the reformer 2 is determined on the basis of the amount of condensed water detected in Step S4. In Step S6, the amount of reforming water fed to the reformer 2 is accordingly regulated (i.e., increased). Specifically, the controller 12 controls the reforming-water feeder 11 such that the amount of reforming water fed to the reformer 2 is regulated on the basis of the amount of condensed water produced in the condenser 8.

As described above, the source-gas conversion proportion of the reformer may be derived in a suitable manner by detecting the temperature of the reformer. Furthermore, variations in the amount of condensed water produced due to condensation of water vapor contained in the recycle gas may be detected in a suitable manner. This enables the amount of reforming water fed to the reformer to be regulated appropriately, which reduces the risk of the reformer being degraded in a suitable manner.

Second Embodiment

The hydrogen generator according to the second embodiment is based on the hydrogen generator according to the first embodiment. In this hydrogen generator, the condenser condenses water vapor contained in the recycle gas by cooling the recycle gas with a coolant and separates the resulting condensed water from the recycle-gas channel.

This structure enables the condense temperature of the recycle gas and the amount of condensed water to be maintained consistent by maintaining the temperature and the flow rate of the coolant that flows through the condenser to be consistent. This makes it possible to regulate the S/C of the reformer to be consistent and may further reduce the risk of the reformer being degraded due to carbon precipitating on the reforming catalyst.

The structure of the hydrogen generator according to the second embodiment may be the same as the structure of the hydrogen generator according to the first embodiment except for the above-described features.

Structure

Figure 5:
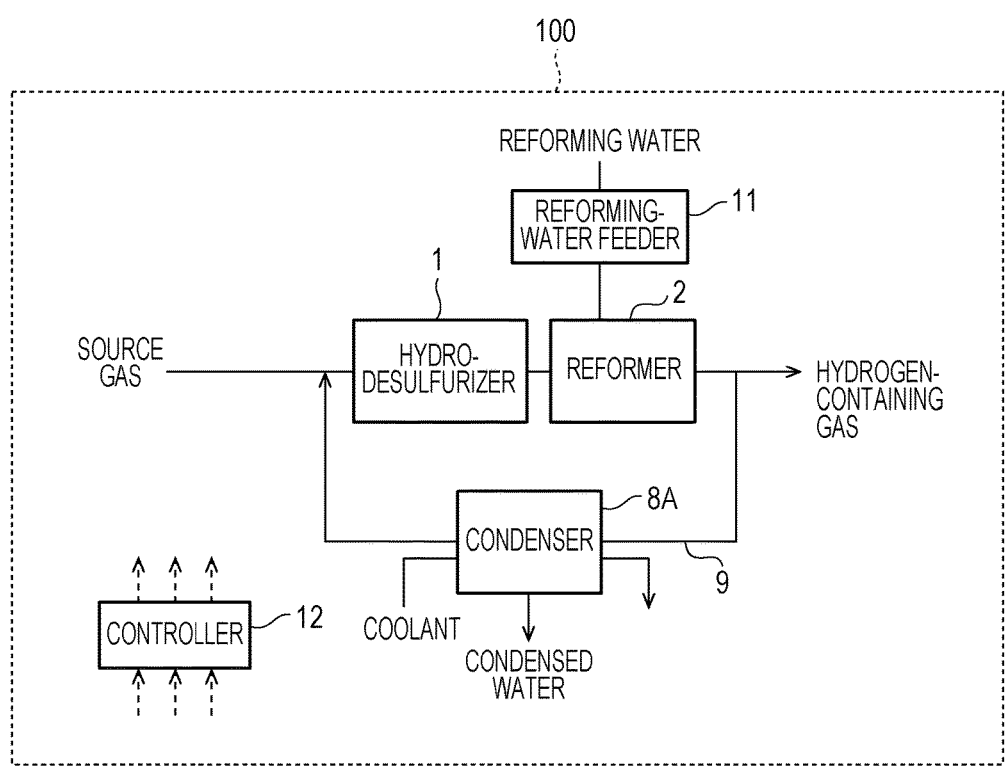
FIG. 5 illustrates an example of a hydrogen generator according to the second embodiment.

FIG. 5 illustrates an example of the hydrogen generator according to the second embodiment.

A hydrogen generator 100 according to the second embodiment includes a hydrodesulfurizer 1, a reformer 2, a reforming-water feeder 11, a recycle-gas channel 9, a condenser 8A, and a controller 12 as illustrated in FIG. 5. The hydrodesulfurizer 1, the reformer 2, the reforming-water feeder 11, the recycle-gas channel 9, and the controller 12 are the same as in the first embodiment, and the descriptions thereof are omitted.

The condenser 8A condenses water vapor contained in the recycle gas by cooling the recycle gas with a coolant and separates the resulting condensed water from the recycle-gas channel 9. The condenser 8A may have any structure that enables water vapor contained in the recycle gas to be condensed by cooling the recycle gas with a coolant and the resulting condensed water to be separated from the recycle-gas channel 9.

Examples of the condenser 8A include a radiator and a heat exchanger. An example of the radiator is a metal cooling fin disposed on a pipe constituting the channels of the condenser 8A. Examples of the heat exchanger include a plate heat exchanger and a double-pipe heat exchanger. In the case where a heat exchanger is employed, the recycle-gas channel 9 and a coolant channel, through which the coolant flows, pass through the heat exchanger. In this heat exchanger, the recycle gas serves as a heating fluid and the coolant serves as a heat-receiving fluid. Examples of the coolant include liquids such as water and antifreeze; and gases such as air contained in a housing of the hydrogen generator 100 and air that enters the housing.

Since the temperature of the recycle gas is high, the housing and the channel members of the condenser 8 are made of a metal such as steel use stainless (SUS) from the viewpoints of heat resistance and corrosion resistance. The condenser 8 includes channels and the like (not illustrated) through which the condensed water produced due to condensation of water vapor in the condenser 8 is separated from the recycle-gas channel 9. The condensed water may be discharged outside the hydrogen generator 100 or reused in the reformer 2 as reforming water. In the case where the condensed water is reused as reforming water, the condenser 8A may include a container used for recovering the condensed water. This enables the condensed water produced in the condenser 8 to be temporarily stored in the container.

Although the second embodiment describes an example case where the recycle gas is cooled with a coolant in the hydrogen generator according to the first embodiment (FIG. 1), a hydrogen generator in which the recycle gas may be cooled with a coolant is not limited to this. For example, the recycle gas may be cooled with a coolant in the hydrogen generator according to the above-described example of the first embodiment (FIG. 2).

Thus, the condense temperature of the recycle gas and the amount of condensed water may be maintained consistent by maintaining the temperature and the flow rate of the coolant that flows through the condenser 8 to be consistent. This makes it possible to regulate the S/C of the reformer 2 to be consistent and may further reduce the risk of the reformer 2 being degraded due to carbon precipitating on the reforming catalyst.

Third Embodiment

A fuel cell system according to the third embodiment includes the hydrogen generator according to any one of the first embodiment, the example of the first embodiment, and the second embodiment; and a fuel cell that generates electric power from a hydrogen-containing gas fed from the hydrogen generator.

The fuel cell system according to the third embodiment may reduce the risk of the reformer being degraded due to shortage of water vapor available in the reformer which may occur in the case where the recycle gas is fed to the hydrodesulfurizer compared with that of the related art and, as a result, the hydrogen-containing gas fed from the hydrogen generator may be fed to the fuel cell in a suitable manner.

Structure

Figure 6:
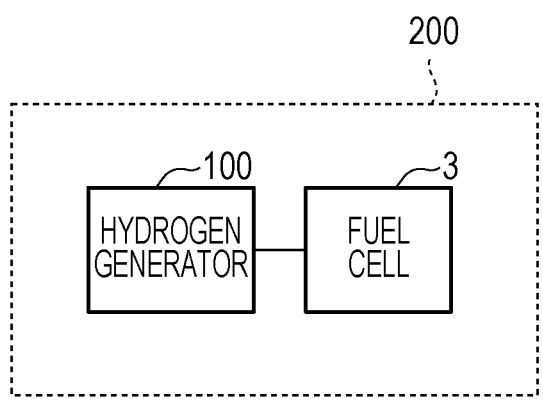
FIG. 6 illustrates an example of a fuel cell system according to the third embodiment.

FIG. 6 illustrates an example of the fuel cell system according to the third embodiment.

A fuel cell system 200 according to the third embodiment includes a hydrogen generator 100 according to any one of the first embodiment, the example of the first embodiment, and the second embodiment; and a fuel cell 3 that generates electric power from a hydrogen-containing gas fed from the hydrogen generator 100 as illustrated in FIG. 6.

The fuel cell 3 generates electric power from a hydrogen-containing gas fed from the hydrogen generator 100. The fuel cell 3 may be any type of fuel cell, and examples thereof include a polymer electrolyte fuel cell, a solid oxide fuel cell, and a phosphoric acid fuel cell. In the case where the fuel cell 3 is a solid oxide fuel cell, the reformer 2 and the fuel cell 3 may be incorporated in one container.

Thus, the risk of the reformer 2 being degraded due to shortage of water vapor available in the reformer 2 which may occur in the case where a recycle gas is fed to the hydrodesulfurizer 1 may be reduced compared with that of the related art and, as a result, the hydrogen-containing gas fed may be fed from the hydrogen generator 100 to the fuel cell 3 in a suitable manner.

Example

A fuel cell system according to an example of the third embodiment is based on the fuel cell system according to the third embodiment. The fuel cell included in this fuel cell system according to the example of the third embodiment is a solid oxide fuel cell.

The degradation of the reformer due to shortage of water vapor available in the reformer is more likely to occur in the case where a solid oxide fuel cell system is employed than in the case where a polymer electrolyte fuel cell system, a phosphoric acid fuel cell system, or the like is employed. The reasons for this are described in detail below. Therefore, the technique according to the present disclosure may be more advantageously applied to a solid oxide fuel cell system than a polymer electrolyte fuel cell system, a phosphoric acid fuel cell system, and the like.

The structure of the fuel cell system according to the example of the third embodiment may be the same as that of the fuel cell system according to the third embodiment except for the above-described features.

Structure

Figure 7:
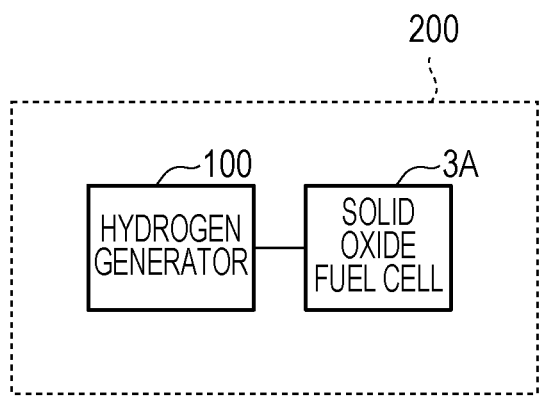
FIG. 7 illustrates an example of a fuel cell system according to an example of the third embodiment.

FIG. 7 illustrates an example of the fuel cell system according to the example of the third embodiment.

The fuel cell system 200 according to the example of the third embodiment includes a solid oxide fuel cell 3A instead of the fuel cell 3 as illustrated in FIG. 7.

In a polymer electrolyte fuel cell system, a phosphoric acid fuel cell system, and the like, electrodes of the fuel cell may be poisoned by carbon monoxide contained in hydrogen-containing gas. Therefore, a hydrogen generator included in a polymer electrolyte fuel cell system, a phosphoric acid fuel cell system, and the like includes a shift converter that removes carbon monoxide by performing a shift reaction. The shift reaction causes most of the source gas to be reformed and reduces variations in the composition of the recycle gas. In other words, variations in the content of water vapor in the recycle gas is reduced. Therefore, the amount of condensed water produced in the condenser 8 is less likely to vary.

In contrast, the hydrogen generator 100 of a solid oxide fuel cell system does not include a shift converter because a solid oxide fuel cell system uses not only hydrogen but also carbon monoxide for generating electric power. Furthermore, since the temperature of the reformer 2 is not regulated in a direct manner, the temperature of the reformer 2 is more likely to vary than in a polymer electrolyte fuel cell system, a phosphoric acid fuel cell system, or the like. Thus, the composition of the recycle gas and the amount of condensed water are also likely to vary due to the variation in the temperature of the reformer 2 and, as a result, the S/C of the reformer 2 is likely to vary. Therefore, the technique according to the disclosure, in which the risk of the reformer 2 being degraded due to shortage of water vapor available in the reformer 2 is reduced by regulating the amount of reforming water fed to the reformer 2 on the basis of the amount of condensed water produced in the condenser 8 may be more advantageously applied to a solid oxide fuel cell system than a polymer electrolyte fuel cell system, a phosphoric acid fuel cell system, and the like.

The hydrogen generators and the fuel cell systems according to the above-described embodiments or the above-described examples may be used in combination as long as they do not exclude one another.

Various modifications and other embodiments of the present disclosure will become apparent to those skilled in the art from the foregoing descriptions. Accordingly, the foregoing descriptions should be regarded as illustrative only and provided in order to illustrate one of the modes best suited to carry out the disclosure. Details of structure and/or functions may be substantially changed without departing from the spirit of the present disclosure.

According to one general aspect of the present disclosure, the risk of the reformer being degraded due to shortage of water vapor available in the reformer which may occur in the case where the recycle gas is fed to a hydrodesulfurizer may be reduced compared with that of the related art. Thus, the technique according to the aspect of the present disclosure may be applied to a method for operating a hydrogen generator, a hydrogen generator, a fuel cell system, and the like.

What is claimed is:

1. A method for operating a hydrogen generator, the method comprising:
    producing a hydrogen-containing gas from a source gas fed from a hydrodesulfurizer and reforming water with a reformer;
    feeding part of the hydrogen-containing gas to the hydrodesulfurizer as a recycle gas, and removing a sulfur compound contained in the source gas with the hydrodesulfurizer;
    condensing water vapor contained in the recycle gas with a condenser disposed on a recycle-gas channel through which the recycle gas flows, and separating the resulting condensed water from the recycle-gas channel;
    obtaining an amount of the condensed water at a condenser disposed on the recycle-gas channel; and
    regulating an amount of reforming water fed to the reformer on a basis of a temperature of the reformer, wherein:
    the amount of reforming water fed to the reformer is regulated on a basis of the amount of the condensed water at the condenser, the temperature of the reformer and at least one selected from a flow rate of the recycle gas and a temperature of the condenser.

2. The method for operating a hydrogen generator according to claim 1, further comprising increasing the amount of reforming water fed to the reformer when the amount of condensed water is increased.

3. A hydrogen generator comprising:
    a hydrodesulfurizer that removes a sulfur compound contained in a source gas by hydrodesulfurization;
    a reformer that produces a hydrogen-containing gas from the source gas fed from the hydrodesulfurizer and reforming water by a reforming reaction;
    a reforming-water feeder that feeds the reforming water to the reformer;
    a recycle-gas channel through which part of the hydrogen-containing gas produced by the reformer is fed to the hydrodesulfurizer as a recycle gas;
    a condenser disposed on the recycle-gas channel, the condenser condensing water vapor contained in the recycle gas and separating the resulting condensed water from the recycle-gas channel;
    a first temperature sensor that detects a temperature of the reformer;
    at least one selected from a flow sensor that detects a flow rate of the recycle gas and a second temperature sensor that detects a temperature of the condenser; and
    a controller that controls the reforming-water feeder such that an amount of the reforming water is regulated on a basis of the temperature of the reformer, wherein:
    the controller obtains an amount of the condensed water at a condenser disposed on the recycle-gas channel, and the controller regulates the amount of the reforming water on the basis of the amount of the condensed water at the condenser, the temperature of the reformer and at least one selected from the flow rate of the recycle gas and the temperature of the condenser.

4. The hydrogen generator according to claim 3, wherein the condenser condenses the water vapor contained in the recycle gas by cooling the recycle gas with a coolant and separates the condensed water from the recycle-gas channel.

5. The hydrogen generator according to claim 3, wherein the controller increases the amount of reforming water fed to the reformer when the amount of condensed water is increased.

6. The hydrogen generator according to claim 3, further comprising a recycle gas flow regulator that regulates the flow rate of the recycle gas flowing in the recycle flow passage.

7. A fuel cell system comprising:
the hydrogen generator according to claim 3; and
a fuel cell that generates electric power from hydrogen-containing gas fed from the hydrogen generator.

8. The fuel cell system according to claim 7, wherein the fuel cell is a solid oxide fuel cell.

* * * * *